Sept. 30, 1969  K. H. FULMER  3,469,890
REACTION MEANS FOR HYDRAULIC CONTROL VALVE
Filed April 10, 1968  2 Sheets-Sheet 2
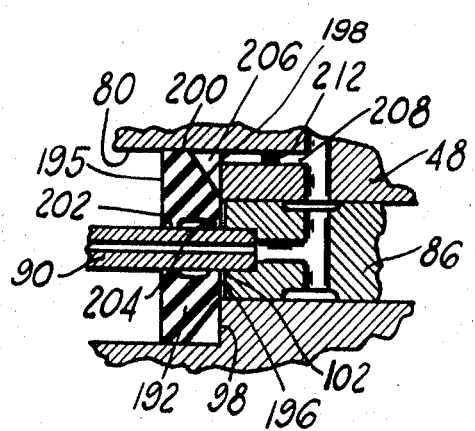
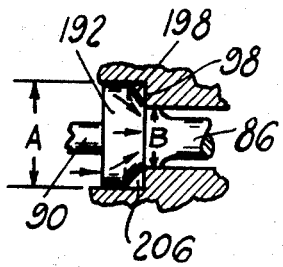
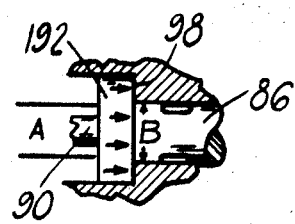
INVENTOR
KEITH H. FULMER
BY
Richard G. Geib
ATTORNEY United States Patent Office 3,469,890
Patented Sept. 30, 1969

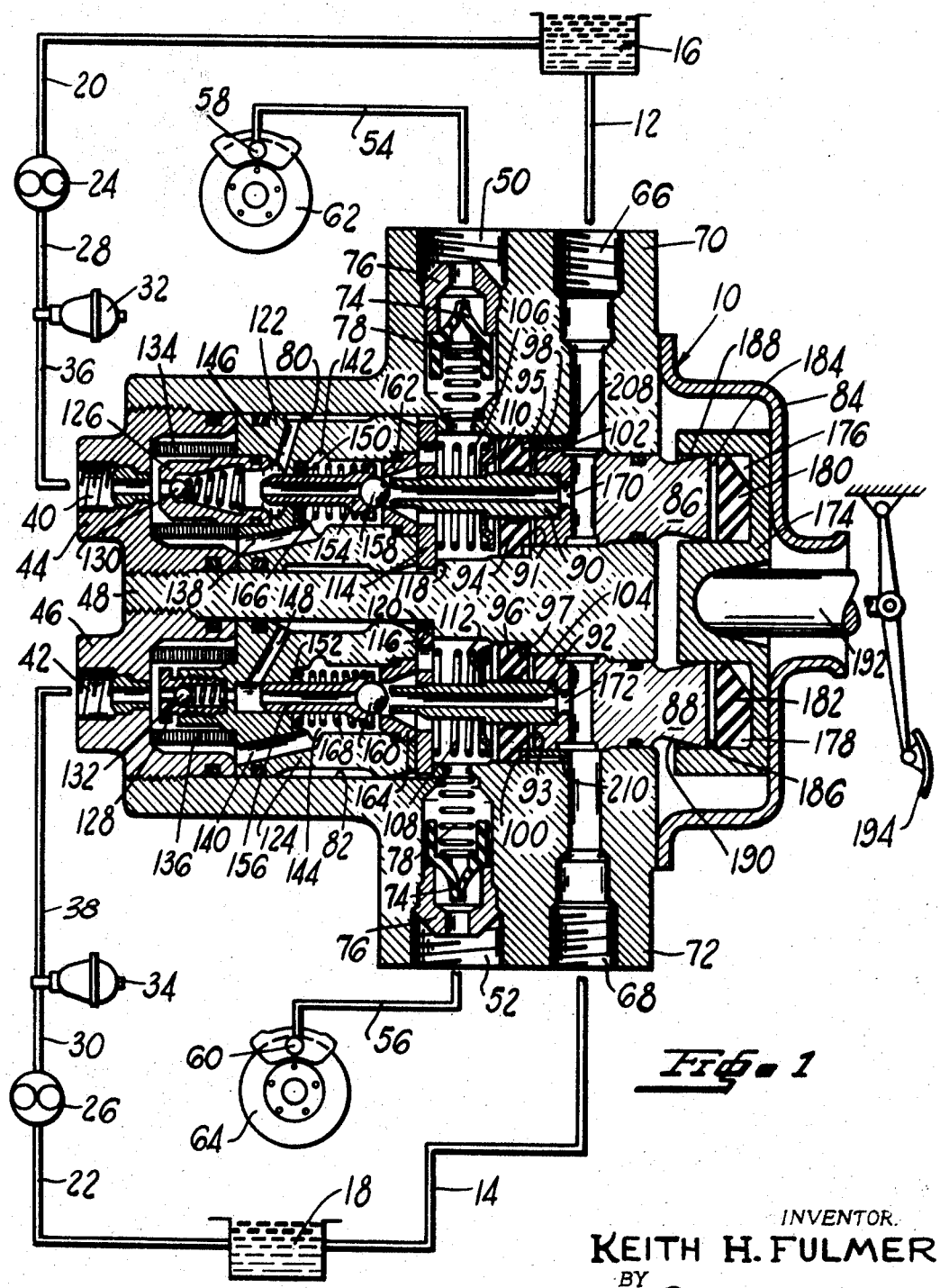

3,469,890
REACTION MEANS FOR HYDRAULIC CONTROL VALVE
Keith H. Fulmer, South Bend, Ind., assignor to The Bendix Corporation, a corporation of Delaware
Filed Apr. 10, 1968, Ser. No. 720,240
Int. Cl. B60t 15/06, 13/00, 13/16
U.S. Cl. 303—52                              9 Claims

ABSTRACT OF THE DISCLOSURE

A reaction device capable of imparting all reaction forces up to a predetermined control pressure to an operator-operated control member and thereafter proportion the reaction forces thereto.

Summary

Reaction devices within the prior art of control mechanisms have taken many forms. A typical cross section of this prior art is found in prior art Patent Nos. 2,685,170, 2,698,205, 2,818,710, 3,109,282, 3,110,031 and 3,149,539 all assigned to the common assignee of this invention. These devices for the most part have proven quite successful in pneumatic control mechanism where it is desirable to have light initial feel of operation until the valve mechanisms have scheduled working pressures of sufficient magnitude across a movable wall to create work therefrom. One exception to this is found in the prior art Patent No. 2,698,205 which suggests that with a control valve for modulating hydraulic pressure delivery to a motor there be a means to provide "two-stage" reaction; i.e., a reaction device, in which, in the low pressure range during initial valve operation the total reaction force is relatively high in proportion to line pressure, whereas, in the high pressure range, the total reaction force is relatively low in proportion to line pressure.

This invention is concerned, therefore, with a means quite frankly to improve the simple reaction means of the prior art Patent No. 3,110,031 such that it will perform the function of the prior art Patent No. 2,698,205 in a manner which has eluded those skilled in the art until this invention. More simply stated it is the object of this invention to provide a single reaction device which does not utilize springs in addition therewith to provide a large reaction area for an operator-operated control element that later, as control pressure rises, changes to a smaller effective reaction area.

The obvious advantage of this invention is in the simplification of reaction devices which contributes to controllability of a brake system, for example, to such an extent as to prevent premature lock-up of the sensitive brake systems.

Drawing description

FIGURE 1 shows a full hydraulic power brake system with a control mechanism according to this invention shown in a cross section side view;

FIGURE 2 shows a partial cross sectioned side view of the control housing and valve plunger with a modification of the reaction disc, as compared to FIGURE 1, assembled therewith;

FIGURE 3 shows the same structure as FIGURE 2 with the reaction disc in full to permit the illustration of the path of reaction forces to the valve plunger on initial valve actuation; and FIGURE 4 shows the structure of FIGURE 3 after a predetermined control pressure has been reached with the consequent reduction in the area of the disc effective to provide reaction to the valve plunger being illustrated.

Detailed description

While it should be noted that the valve apparatus of this invention is applicable to any hydraulic system, as those skilled in the art to which it relates, will undoubtedly recognize, it has occurred to the inventor to be particularly applicable in a full hydraulic power braking system. In such a system a valve 10 embodying the principles of this invention is connected by conduits 12 and 14 to reservoirs 16 and 18, respectively. If desired, the reservoirs 16 and 18 may be combined so that there is but one common reservoir for the valve 10. Conduits 20 and 22 connect the reservoirs 16 and 18 to pumps 24 and 26 which are in turn connected by conduits 28 and 30 to accumulators 32 and 34. The pumps 24 and 26 are of a type well known within the skill of the art that incorporate by-pass provisions for circulating the fluid therefrom back to the reservoir whenever the pressure in the accumulators 32 and/or 34 has reached a desired value. The accumulators 32 and 34 are connected by conduits 36 and 38 to separate fluid inlet ports 40 and 42 provided by plugs 44 and 46 threadedly assembled to the housing 48 of the valve 10. The housing 48 is provided with discharge ports 50 and 52, which are separate from each other, and to which conduits 54 and 56 communicate the discharge ports to disc brake motors 58 and 60 of the front brake 62 and the rear brake 64, respectively, of the vehicle in which the valve 10 is employed. Before leaving this general description, it should be noted that return return ports 66 and 68 to which the conduits 12 and 14 are connected are also machined within the upper and lower bosses 70 and 72 accommodating the discharge ports 50 and 52. Furthermore, residual check valve means in the form of a resilient duck bill member 74 cooperating with a ferrule 76 because of the springs 78 between the bottom of the ports 50 and 52 and the valve 74 may be utilized to maintain a slight residual pressure in the conduits 54 and 56. It will be readily recognized by those skilled in the art to which this invention relates that certain disc brake apparatus do not require residual brake pressure maintenance and therefore these residual valves 74 may be eliminated from the discharge side of the valve 10.

The housing 10 is, in the embodiment shown, provided with parallel stepped bores 80 and 82 in which the valve means is assembled and held therein upon the joining of the plugs 44 and 46 within the open end of the forward face of the housing 48. These bores 80 and 82 open also on a rearward face of the housing 48. However, a cover 84 is affixed to the housing, as by bolts, to prevent contaminants from interfering with this open end of the bores 80 and 82 and the structure, such as valve plungers 86 and 88 having O-ring seals to slidably be carried in the smaller portion of the parallel bores 80 and 82, respectively. The O-ring seals on the plungers 86 and 88 maintain the integrity of the compartments within the housing between the respective plugs 44 and 46 and the valve plungers 86 and 88.

Within these compartments the valve means is preassembled prior to the joinder of the plugs 44 and 46, which valve means comprises a hollow projection 90 and 92 on each of the plungers 86 and 88, rubber reaction disc 94 and 96 about the hollow plungers 90 and 92. The discs 90 and 92 are shaped so that they are provided with an inner and outer diameter on their rear face with the inner diameters 91 and 93 projecting such that the outer diameters 95 and 97 are spaced from shoulders 98 and 100 of the housing 48 at the point where the parallel bores 80 and 82 are stepped down to their smallest diameter. Faces 102 and 104 of the valve plungers 86 and 88 form the effective area for the transmission of reaction forces to the operator of the vlave means, and in the released attitude are slightly spaced from the diameters 91 and 93 so as to permit valve lapping prior to pick-up of the discs.

Also within the compartments are valve return springs 106 and 108 between spring retainer plates 110 and 112 carried by the hollow plungers 90 and 92 and plates 114 and 116 held against shoulders 118 and 120 of the bores 80 and 82 by means of valve housings 122 and 124 positioned in the bores 80 and 82 by the plugs 44 and 46, respectively. The valve housings 122 and 124 have press fitted or threaded to their forward end relief valves 126 and 128 comprising simple spring biased ball valves 130 and 132 whose faces are exposed to hydraulic pressure of the inlet ports 40 and 42. About the relief valves 126 and 128 annular filters 134 and 136 are located to be between the inlet ports 40 and 42 and passages 138 and 140 in the respective valve housings 122 and 124 leading to respective valve chambers 142 and 144. Chambers 142 and 144 are closed from pressure relief passages 146 and 148 in the valve housings 122 and 124 by means of seals 150 and 152 about valve stems 154 and 156 to which are press fitted steel balls 158 and 160 completing the poppet valve assembly of the stem and ball.

Valve seats 162 and 164 are press fitted within the rear face of the valve housings 122 and 124 to cooperate with the steel balls 158 and 160 urged by valve springs 166 and 168 thereagainst.

As seen, and when assembled, the hollow plungers 90 and 92 have a forward face adapted for abutment with the steel balls 158 and 160 to terminate communication of the discharge ports 50 and 52 with the return ports 66 and 68 via passages 170 and 172 in the plungers 86 and 88, respectively. It should also be noted that the rearwardly positioned face of the valve housings 122 and 124 are not provided with seal means cooperating with the bores 80 and 82; whereas the forward faces are provided with O-ring type seals, as is the inward portion of the plugs 44 and 46 to maintain the integrity of the hydraulic pressure source supplied to the valve chambers 142 and 144. The valve stems 154 and 156 are preferably of hollow construction so that any hydraulic pressure fluid coming between the steel balls 158 and 160 and these stems 154 and 156 can be passed to the reservoirs 16 and 18 without tending to disassemble the steel balls from the stems.

Within the cover 84 for the rearward face of the housing 48 a cap 174 is provided having spaced cavities 176 and 178 within which cone shaped rubber discs 180 and 182 are operatively positioned between faces 184 and 186 of the respective plungers 86 and 88, and the cap 174. The cone shaped rubber or similar resilient means 180 and 182 is so positioned as to have its apex or area of smaller diameter operatively abutting the bottom of the cavities 176 and/or 178 with its largest diameter or base portion exerting force over substantially the entire area of the faces 184 and 186. These faces 184 and 186 have limited axial dimension so that the cap 174 may move angularly with respect to the plungers 86 and 88. In this regard, the ends of the plungers 86 and 88 are machined to have a tapered peripheral surface 188 and 190 converging toward the rearward face of the housing 48 to permit the limited angular movement of the cap 174. Cap 174 is abuttingly connected to a push rod 192 that is affixed to a brake pedal 194 under the control of the operator of the vehicle within the operator's compartment.

With regard now to FIGURE 2 there is shown a modified disc 192 having a flat frontal face or surface 195 and a central flat area surface 196 equal in area to reaction face 102 of plunger 86 with an angular surface 198 projecting forwardly therefrom to provide a peripheral surface 200 of limited length sealing the bore 80 ahead of shoulder 98. As with discs 94 and 96 which disc 192 may replace, the central opening is provided with fore and aft lips 202 and 204 sealingly associated with projection 90 to complete the segregation of the control chamber ahead of the disc(s).

In this alternate construction shown by FIGURE 2 an annular space 206 is created between the housing 48 and the outer diameter of the rear face prescribed by surfaces 95, 97 or 198. This space 206 is connected to return port 66 by bleed passages 208 and 210. If desired, a restriction 212 may be placed in these passages as shown by FIGURE 2 to retard the deformation of the discs onto shoulders 98 and 100.

Operation

In operation, an operator will depress brake pedal 194 to move the push rod 192 inwardly and carry with it the cap or link 174. The resiliency of the connectors such as the cone rubber discs 180 and 182 will permit travel for the push rod 192 of a greater proportion than that attributable to the valve plungers 86 and 88 in that the discs 180 and 182 are compressing during this part of the operation. Also, as the shape of the disc provides free space within the cavities 176 and 178, the cap 174 will be permitted to angularly adjust to equalize the amount of input force from the push rod 192 via the link 174 to the valve plungers 86 and 88.

The first movement of the valve plungers 86 and 88 close off the return communication to the discharge ports 50 and 52, as aforementioned by lapping the hollow plungers 90 and 92 on the steel balls 158 and 160. At this point the faces 102 and 104 of plungers 86 and 88 abut inner diameters 91 and 93 of the discs. In order to communicate the hydraulic pressure from the accumulators 32 and 34 within the valve chambers 142 and 144 further effort is required of the operator on the brake pedal 194. This further effort will unseat the steel balls 158 and 160 from the seats 162 and 164 of the valve housings 122 and 124 whereby fluid will flow outwardly from the chambers 142 and 144 to the discharge ports 50 and 52 about the hollow plungers 90 and 92.

With reference now to FIGURE 3 this pressure will act on the discs, such as disc 192 shown, such that the force on reaction area A of the front face will be completely transmitted to area B of the face of plunger 86.

As pressure builds up at the discharge port because of the work of the disc brake motors 58 and 60, disc 192 will be deformed such that surface 198 is pressed onto shoulder 98. At this time the reaction area A is reduced to be equal to area B of the face of plunger 86, as seen in FIGURE 4. From this time on reaction felt by the operator at the brake pedal is but a proportion of the control pressure being developed, as part of the reaction forces are transmitted to the structure of housing 48 surrounding the plunger(s).

Upon release of the brake pedal 194 the valve return springs 106 and 108 as well as the valve springs 166 and 168 will return the valve elements to the released attitude shown. If desired, an additional return spring may be provided on a brake pedal 94 as is familiar to those skilled in the art to which this invention relates.

I claim:

1. A fluid pressure control device having an inlet pressure control valve adapted to be opened by a valve plunger which is slidable in a bore of a housing such that a control pressure chamber exists between said control valve and said valve plunger which control pressure chamber is open directly to a discharge port of said housing and via said valve plunger until it seats on said control valve to a return port of said housing, said device being characterized by the improvement of a reaction means within said bore forming a seal for said valve plunger maintaining the integrity of said control chamber such that control chamber fluid pressure is proportioned between said housing and said valve plunger to provide operator feel, said reaction means including means to delay transmittal of the force of the control chamber pressure to said housing such that initially said force is transmitted entirely to said valve plunger.

2. A fluid pressure control device according to claim 1 wherein said reaction means includes a resilient device having a surface abutting a face of said valve plunger while being spaced from a shoulder of said housing to define a fluid chamber between said housing and said resilient device about said plunger on the side of said resilient device opposite its face exposed to said control chamber.

3. A fluid pressure device according to claim 2 wherein said valve plunger is a two part assembly having a hollow projection assembled within a counterbored passage of an operator-operated plunger with said resilient device having a sealing connection with said projection and being normally spaced from a face of said plunger therebehind which space is taken up upon travel sufficient to open said control valve.

4. A fluid pressure device according to claim 2 wherein said housing is provided with a bleed passage communicating said fluid chamber to said return port.

5. A hydraulic control valve comprising:
 a housing of two or more compartments each of which is provided with a pressure inlet, a control discharge and a fluid return port, said compartments including bores within said housing;
 valve plunger means within said bores and operably adapted to move therein, said plunger means each having hollow projections and passage means registering therewith and communicable to the fluid return port;
 deformable reaction means for each of said plunger means sealing said compartments ahead of said return ports from same save for said hollow plunger, said reaction means having a face for abutting said plunger which about said plunger is normally spaced from a shoulder in said bore of said housing to delay apportioning of reaction forces to said housing until a predetermined control pressure exists at said control discharge whereafter said reaction means proportions reaction force between said housing and said plunger means;
 valve means in said compartments having poppet valves operably related to said projections to be operated thereby, said valve means being operable within a valve chamber communicable with said pressure inlet such that in the normal released position said poppet valve bars flow of control pressure from said pressure inlet to said control discharge via a control chamber between said valve means and said reaction means about said hollow projection within said control chamber which in the released attitude communicates same to said return port, said valve means being operable by said projection to first segregate said control chamber when said plunger means abuts said reaction means and thereafter communicate it with said valve chamber such that fluid pressure acts initially via said reaction means on said plunger means; and
 means to actuate said valve plunger means to bring about the cooperation of it and said valve means aforementioned.

6. The valve of claim 5 wherein said deformable reaction means is a rubber disc having a first face for said control chamber and a second face with a first area and a second area operatively related to said plunger and said housing whereby said second area is normally spaced from said housing until a predetermined control pressure is reached in said control chamber to deform said second area into contact with said housing.

7. The valve of claim 6 wherein the space between said second area and said housing is connected by a flow passage to said return port.

8. The valve of claim 7 wherein said second face includes a central flat surface as said first area and a tapered surface converging towards said first face radially outwardly of said central flat surface providing a limited length peripheral surface between said first and second faces.

9. The valve of claim 7 wherein said disc is annular and has fore and aft sealing rings integral therewith at the first and second faces, respectively, cooperating with said projection and a limited peripheral surface length cooperating with sidewalls of the bore to seal the control chamber in front of the disc from the bore therebehind.

References Cited

UNITED STATES PATENTS

| 2,698,205 | 12/1954 | Gagen | 303—54 |
| 3,106,874 | 10/1963 | Schultz | 91—434 |

MILTON BUCHLER, Primary Examiner

JOHN J. McLAUGHLIN, Jr., Assistant Examiner

U.S. Cl. X.R.

91—434; 137—596.2, 627.5; 303—6, 10, 56